US006631415B1

(12) United States Patent
James et al.

(10) Patent No.: US 6,631,415 B1
(45) Date of Patent: Oct. 7, 2003

(54) METHOD AND SYSTEM FOR PROVIDING A COMMUNICATION CONNECTION USING STREAM IDENTIFIERS

(75) Inventors: David Vernon James, Palo Alto, CA (US); Bruce Fairman, Woodside, CA (US); Hisato Shima, Tokyo (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/531,065

(22) Filed: Mar. 18, 2000

(65) Prior Publication Data (65)

Related U.S. Application Data
(60) Provisional application No. 60/125,321, filed on Mar. 19, 1999.

(51) Int. Cl.[7] .......................... G06F 15/16; G06F 13/36
(52) U.S. Cl. ....................... 709/227; 709/228; 710/306; 370/260
(58) Field of Search ................................. 710/314, 311, 710/53, 65, 317, 27, 33, 306, 312; 709/224, 233, 234, 235, 218, 227, 228, 253; 713/167, 168, 171; 712/32; 370/260

(56) References Cited

U.S. PATENT DOCUMENTS

| | | | |
|---|---|---|---|
| 4,538,259 A | 8/1985 | Moore | 370/60 |
| 4,935,894 A | 6/1990 | Ternes et al. | |
| 5,179,669 A * | 1/1993 | Peters | 710/317 |
| 5,381,138 A | 1/1995 | Stair et al. | 340/825.44 |
| 5,402,416 A | 3/1995 | Cieslak et al. | 370/60 |
| 5,485,505 A | 1/1996 | Norman et al. | 379/58 |
| 5,511,165 A | 4/1996 | Brady et al. | |
| 5,603,084 A | 2/1997 | Henry, Jr. et al. | 455/33.1 |
| 5,623,483 A | 4/1997 | Agrawal et al. | 370/253 |
| 5,684,796 A | 11/1997 | Abidi et al. | 370/389 |
| 5,684,959 A | 11/1997 | Bhat et al. | |
| 5,689,499 A | 11/1997 | Hullett et al. | 370/235 |
| 5,717,853 A | 2/1998 | Deshpande et al. | |
| 5,724,517 A | 3/1998 | Cook et al. | 395/200.57 |
| 5,734,824 A | 3/1998 | Choi | 395/200.11 |
| 5,751,967 A | 5/1998 | Raab et al. | 395/200.58 |
| 5,757,772 A | 5/1998 | Thornberg et al. | 370/236 |
| 5,764,930 A | 6/1998 | Staats | 395/287 |
| 5,774,683 A | 6/1998 | Gulick | |
| 5,790,530 A | 8/1998 | Moh et al. | 370/363 |
| 5,790,815 A | 8/1998 | Swanstrom et al. | 395/309 |

(List continued on next page.)

OTHER PUBLICATIONS

"IEEE 1394: A Ubiquitous Bus," Gary Hoffman and Daniel Moore, Compcon '95 in San Francisco, CA, Mar. 5–9, 1995, http://www.skipstone.com/compcon.html (9 pages).

"Fire on Wire: The IEEE 1934 High Performance Serial Bus," The IEEE Miicrocomputer Standards Committee, 1986, http://www.chumpchange.com/parkplace/video/dvpapers/firewire.html (18 pages).

Primary Examiner—Zarni Maung
Assistant Examiner—Kenny Lin
(74) Attorney, Agent, or Firm—Blakely, Sokoloff, Taylor & Zafman LLP

(57) ABSTRACT

A method and a system for providing a connection using a stream identifier ("id") are disclosed. In one embodiment, the system identifies a talker node, which provides an isochronous data stream via a communication media. Once the talker node is identified, an identifier and an sub-identifier of the talker node are identified. After identifying the identifier and sub-identifier, the stream id associated with the isochronous data stream is identified in response to the identifier and sub-identifier. Next, the system establishes at least one connection according to the stream id. When the connection between the second and talker nodes is established, the listener node reads the isochronous data stream.

20 Claims, 10 Drawing Sheets

U.S. PATENT DOCUMENTS

| | | | |
|---|---|---|---|
| 5,812,774 A | 9/1998 | Kempf et al. | 395/200.42 |
| 5,825,752 A * | 10/1998 | Fujimori et al. | 370/260 |
| 5,832,245 A | 11/1998 | Gulick | |
| 5,842,124 A | 11/1998 | Kenagy et al. | 455/418 |
| 5,848,266 A | 12/1998 | Scheurich | 395/558 |
| 5,854,910 A | 12/1998 | Gulick | |
| 5,870,387 A | 2/1999 | Mulla | 370/258 |
| 5,872,524 A | 2/1999 | Iida | 340/825.52 |
| 5,872,944 A | 2/1999 | Goldrian et al. | 395/306 |
| 5,875,301 A | 2/1999 | Duckwall et al. | 395/200.51 |
| 5,883,621 A | 3/1999 | Iwamura | 345/327 |
| 5,892,929 A | 4/1999 | Welker | 395/287 |
| 5,901,332 A | 5/1999 | Gephardt et al. | 395/861 |
| 5,905,732 A | 5/1999 | Fimoff et al. | 370/516 |
| 5,910,178 A | 6/1999 | Moh et al. | 709/232 |
| 5,920,267 A | 7/1999 | Tattersall et al. | 340/825.05 |
| 5,923,673 A | 7/1999 | Henrikson | |
| 5,930,703 A | 7/1999 | Cairns | 455/418 |
| 5,935,208 A | 8/1999 | Duckwall et al. | 709/221 |
| 5,938,748 A * | 8/1999 | Lynch et al. | 710/53 |
| 5,941,964 A | 8/1999 | Young et al. | |
| 5,961,623 A | 10/1999 | James et al. | 710/113 |
| 5,970,234 A | 10/1999 | Jin | |
| 5,974,036 A | 10/1999 | Acharya et al. | 370/331 |
| 5,978,854 A | 11/1999 | Fujimori et al. | 709/245 |
| 5,991,520 A | 11/1999 | Smyers et al. | 395/280 |
| 6,005,852 A | 12/1999 | Kokko et al. | 370/329 |
| 6,023,732 A | 2/2000 | Moh et al. | 709/232 |
| 6,032,211 A | 2/2000 | Hewitt | 710/107 |
| 6,038,625 A | 3/2000 | Ogino et al. | 710/104 |
| 6,055,561 A | 4/2000 | Feldman et al. | 709/200 |
| 6,072,772 A | 6/2000 | Charny et al. | 370/229 |
| 6,085,270 A | 7/2000 | Gulick | 710/100 |
| 6,104,706 A | 8/2000 | Richter et al. | 370/263 |
| 6,108,718 A | 8/2000 | Fujimori et al. | 710/9 |
| 6,119,243 A | 9/2000 | Garney et al. | 713/600 |
| 6,131,119 A | 10/2000 | Fukui | 709/224 |
| 6,137,777 A | 10/2000 | Vaid et al. | 370/230 |
| 6,138,178 A | 10/2000 | Watanabe | 710/8 |
| 6,138,196 A | 10/2000 | Takayama et al. | 710/105 |
| 6,141,767 A | 10/2000 | Hu et al. | 714/1 |
| 6,151,651 A | 11/2000 | Hewitt et al. | 710/129 |
| 6,185,632 B1 | 2/2001 | Berkema | 710/20 |
| 6,192,428 B1 | 2/2001 | Abramson et al. | 710/52 |
| 6,233,637 B1 * | 5/2001 | Smyers et al. | 710/311 |
| 6,336,179 B1 * | 1/2002 | Gulick | 712/32 |

* cited by examiner

METHOD AND SYSTEM FOR PROVIDING A COMMUNICATION CONNECTION USING STREAM IDENTIFIERS

This application claims benefit of U.S. Provisional Application No. 60/125,321 filed Mar. 19,1999.

FIELD OF THE INVENTION

The present invention relates generally to audio, video, and audio/video interconnected systems. In particular, the present invention relates to communications on audio/video interconnected systems using steam identifiers.

BACKGROUND OF THE INVENTION

With the development of consumer electronic audio/video (A/V) equipment, and the advance of digital A/V applications, such as consumer A/V device control and signal routing and home networking, various types of data in various formats can now be transferred among several audio/video control (AV/C) devices via one digital bus system. However, many current systems do not have sufficient bandwidth resources to transfer and display all the different types of data at the same time.

Typical computer systems solve the bandwidth problem by increasing the bandwidth of the system bus to handle all of these forms, types and amount of data. As a result, as users request more types of information such as in multimedia applications, the system bus has become more clogged with information other than information directly utilized and needed by the main processor.

Many computer systems incorporate at least two buses. A first bus, commonly referred to as a memory bus, is typically used for communications between a central processor and a main memory. A second bus, known as a peripheral bus, is used for communications between peripheral devices such as graphics systems, disk drives, or local area networks. To allow data transfers between these two buses, a bus bridge is utilized to "bridge" and thereby couple, the two buses together.

One example of a high-speed bus system for interconnecting A/V nodes, configured as a digital interface used to transport commands and data among interconnecting audio/video control (AV/C) devices, is the IEEE 1394 standard serial bus implemented by IEEE Std 1394–1995, *Standard For A High Performance Serial Bus*, Aug. 30, 1996 (hereinafter "IEEE 1394 standard") and related other 1394 standards.

The IEEE 1394 standard is an international standard for implementing a high-speed serial bus architecture, which supports both asynchronous and isochronous format data transfers. The IEEE 1394 standard defines a bus as a non-cyclic interconnect, consisting of bus bridges and nodes. Within a non-cyclic interconnect, devices may not be connected together so as to create loops. Within the non-cyclic interconnect, each node contains an AV/C device, and bus bridges serve to connect buses of similar or different types.

The primary task of a bridge is to allow data to be transferred on each bus independently without demonstrating performance of the bus, except when traffic crosses the bus bridge to reach the desired destination on the other bus. To perform this function, the bridge is configured to understand and participate in the bus protocol of each of the buses.

Multi-bus systems are known to handle the large amounts of information being utilized. However, communication between buses and devices on different buses is difficult. Typically, a bus bridge may be used to interface I/O buses to the system's high-performance processor/memory bus. With such I/O bridges, the CPU may use a 4-byte read and write transaction to initiate DMA transfers. When activated, the DMA of a serial bus node generates split-response read and write transactions which are forwarded to the intermediate system backbone bus which also implements serial bus services.

Depending on the host system design, the host-adapter bridge may have additional features mandated by differences in bus protocols. For example, the host bus may not directly support isochronous data transfers. Also, the host-adapter bridge may enforce security by checking and translating bridge-bound transaction addresses and may often convert uncached I/O transactions into cache-coherent host-bus transaction sequences.

Each time a new device or node is connected or disconnected from an IEEE 1394 standard serial bus, the entire bus is reset and its topology is reconfigured. The IEEE 1394 standard device configuration occurs locally on the bus without the intervention of a host processor. In the reset process, three primary procedures are typically performed; bus initialization, tree identification, and self identification. Within the IEEE 1394 standard, a single node must first be established as the root node during the tree identification process in order for the reconfiguration to occur.

A conventional isochronous bus connection includes multiple buses, one or more bus bridges, a talker node, and one or more listener nodes. A talker node usually provides an isochronous data stream and forwards the isochronous data stream onto a bus. A listener node typically reads the packets from the isochronous data stream.

A problem with a conventional isochronous bus connection is that each listener node requires a communication connection between the listener node and the talker node. Thus, if multiple listener nodes want to listen to the data from the talker node, multiple independent communication connections between the listener nodes to the talker node are required. Each communication connection requires isochronous resources to operate. Accordingly, multiple independent communication connections between listener nodes and a talker node absorbs large amount of isochronous resources and consequently, reduces the overall bus performance.

SUMMARY OF THE INVENTION

A method and a system for providing a connection using a stream identifier ("id") are disclosed. In one embodiment, the system identifies a talker node, which provides an isochronous data stream via a communication media. Once the talker node is identified, an identifier and an sub-identifier of the talker node are identified. After identifying the identifier and sub-identifier, the stream id associated with the isochronous data stream is identified in response to the identifier and sub-identifier. Next, the system establishes at least one connection according to the stream id. When the connection between the second and talker nodes is established, the listener node reads the isochronous data stream.

BRIEF DESCRIPTION OF THE DRAWINGS

Features and advantages of the prevention invention will be apparent to one skilled in the art in light of the following detailed description in which.

DETAILED DESCRIPTION

A method and system for providing connections between nodes using stream identifiers are described.

For purposes of explanation, in the following description, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

A communication mechanism, which may be used in an IEEE 1394 environment, provides a communication connection management for isochronous connections. An isochronous bus connection may include a talker and multiple listeners. The terms talker and talker node will be used interchangeably herein. Likewise, the terms listener and listener node will be used interchangeably herein. In one embodiment, the mechanism allows a listener to receive the isochronous data stream from a talker using a stream identifier ("id").

In one embodiment, the mechanism identifies a stream id associated with the isochronous data stream from the talker according to an extended unique identifier ("EUI") and a plug id of the talker. In an alternative embodiment, the address offset, which may be the 48-bit after the node address, and the register offset may be used to determine the stream id. The address offset is used to access hardware register resources. The register offset is the offset of the ROM (read only memory) entry that describes the resources. When the stream id is identified, the mechanism establishes one or more communication or bus connections according to the stream id. After the communication between the talker and listener is established, the listener can read the packets from the isochronous data stream.

Figure 1:
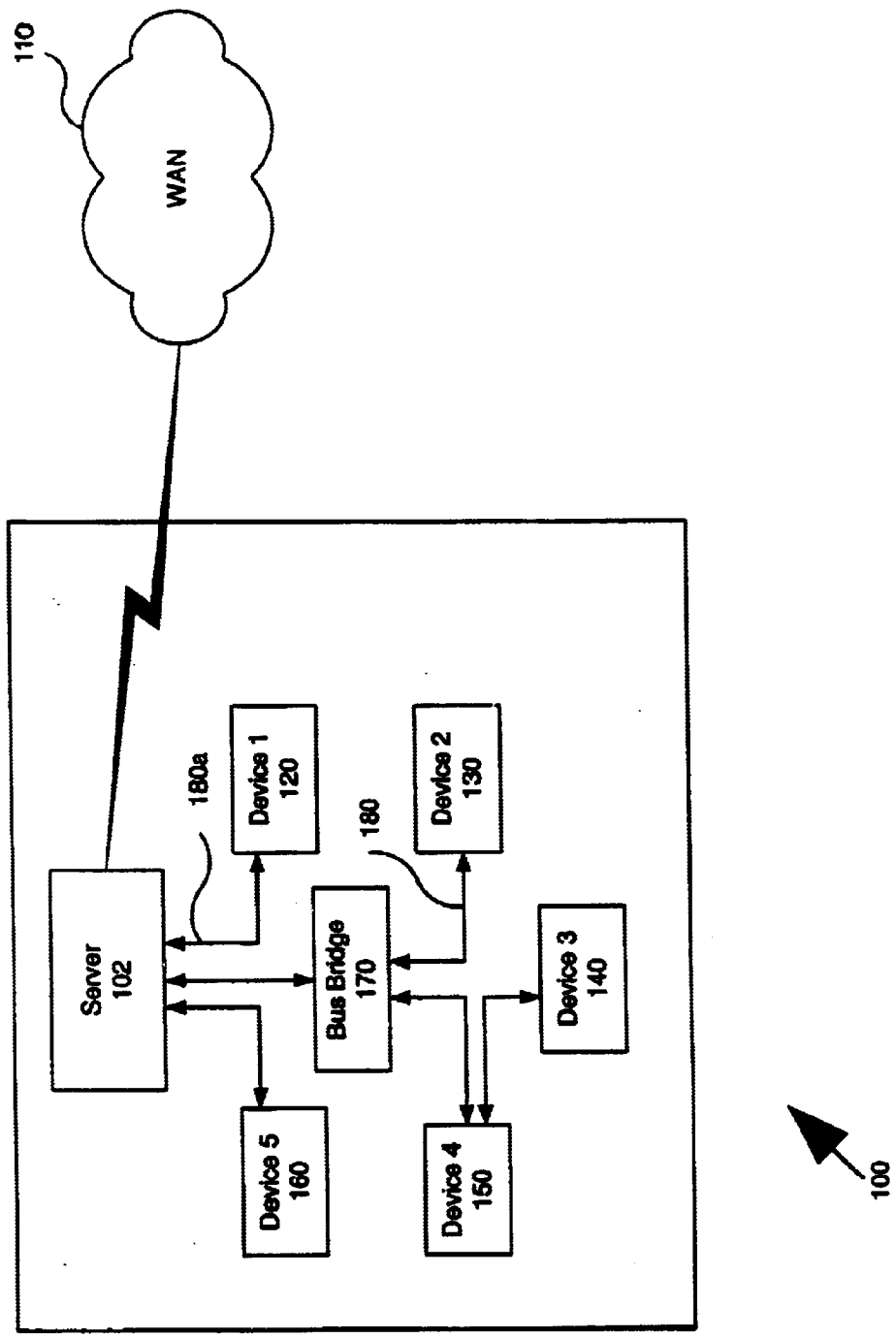
FIG. 1 is a block diagram of one embodiment for an interconnect topology.

FIG. 1 is a block diagram of one embodiment for an interconnect topology 100. Referring to FIG. 1, server 102 is connected to a wide area network (WAN) 110 and to a bus bridge 170. The bus bridge is interconnected to a number of audio, video, and/or audio/video devices, 120, 130, 140, 150, and 160. In one embodiment, the devices (120–160) are connected to bus bridge 170 via the IEEE 1394 standard serial bus. Server 102 may be any device that is capable of connection to both a bus bridge 170 and wide area network 110, such as, for example, a personal computer or a set-top box. In one embodiment, network 110 may be a wide area network, such as, for example, the Internet, or a proprietary network such as America Online®, Compuserve®, Microsoft Network®, or Prodigy®. In addition, WAN 110 may be a television communications network. Server 102 includes a network interface which communicates with WAN 110.

Topology 100 includes high speed serial bus 180a and 180. In one embodiment, serial bus 180 is the IEEE 1394 standard serial bus. Topology 100 includes various consumer electronic devices 120–160 connected via the high speed serial bus 180 to bus bridge 170. The consumer electronic devices 120–160 may include, for example, a printer, additional monitor, a video camcorder, an electronic still camera, a video cassette recorder, digital speakers, a personal computer, an audio actuator, a video actuator, or any other consumer electronic device that includes a serial interface which complies with a serial interface standard for networking consumer electronic devices—for example, the IEEE 1394 standard. Topology 100 may be contained within a home or office. Bus bridge 170 is used to connect devices 120–160 in which devices 120–160 may be physically located within different rooms of the home or office. Although the original IEEE bus standard is designed for use with a cable interconnect, any communication media may be used such as radio frequency (RF) communication or the like.

Figure 2:
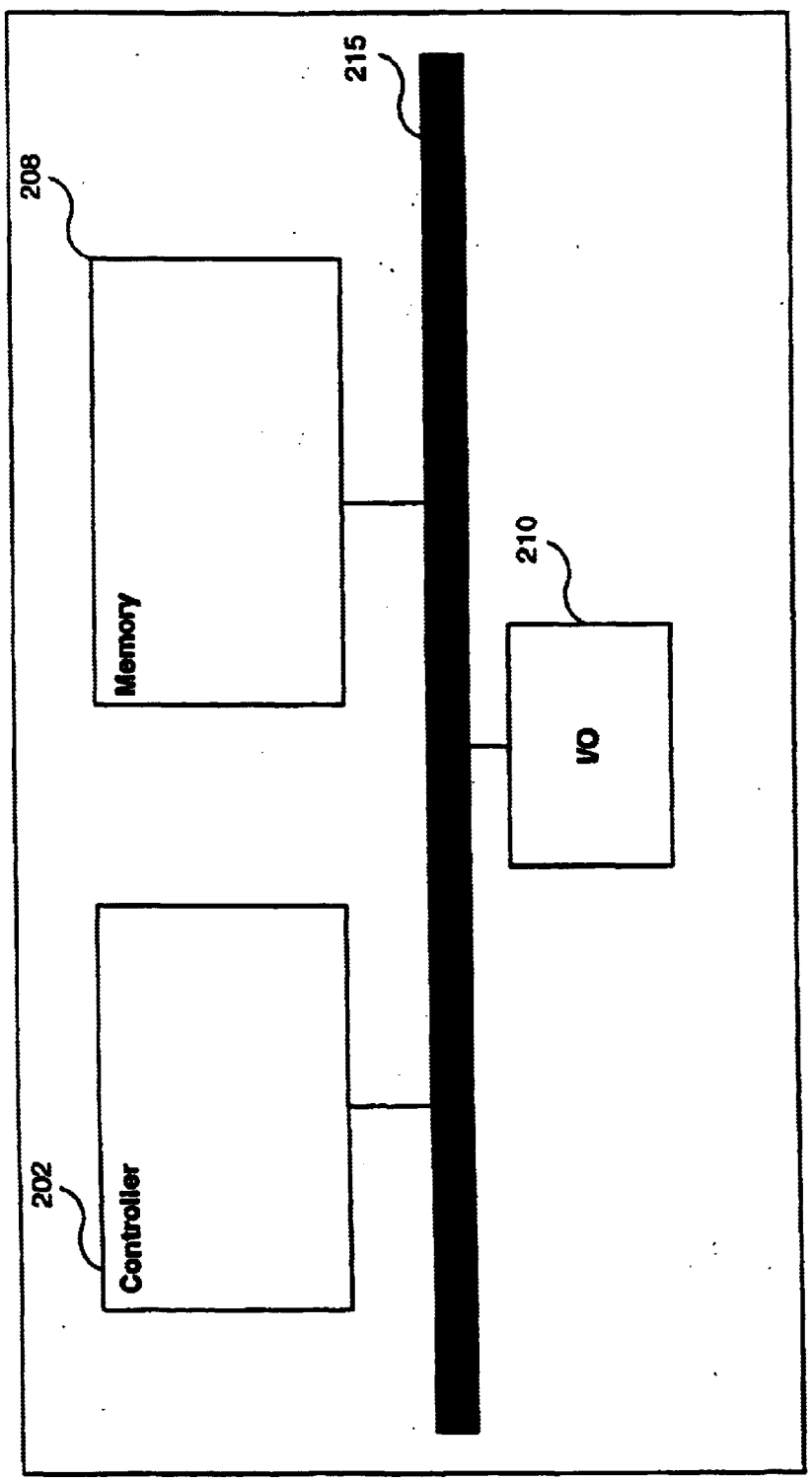
FIG. 2 is a block diagram of a device of FIG. 1.

FIG. 2 is a block diagram of a device 120. Referring to FIG. 2, device 120 may be a laser printer, digital camera, set-top box, or any other appropriate consumer electronic device capable of being connected via a high speed serial bus 180: In one embodiment, the device 120 includes a controller 202, memory 208, and I/O 210, all connected via bus 215. Memory 208 may include, for example, read only memory (ROM), random access memory (RAM), and/or non-volatile memory. I/O 210 provides connection with wide area network 110, bus bridge 170, and another peripheral device (130–160).

In one embodiment, I/O 210 is a serial bus interface that complies with a serial interface standard for networking with consumer electronic devices (120—160) and bus bridge 170 within topology 100. For example, the serial bus interface and topology 100 may use the IEEE 1394 standard serial bus. I/O 210 provides for receiving signals from and transmitting signals to other consumer electronic devices (130–160) or bus bridge 170.

Memory 208 provides temporary storage for voice and data signal transfers between outside network 110 and topology 100. In addition, memory 208 may buffer digital voice and data signals received by I/O 210 from WAN 110 before signals are transmitted onto IEEE 1394 standard bus 180.

Controller 202 controls various operations of device 120. Controller 202 monitors and controls the traffic through the device 120 to and from topology 100 and WAN 110.

Device 120 I/O 210 may have one or more physical ports. A single port device discontinues the bus along the given branch of the bus, whereas devices with two or more ports allow continuation of the bus. Devices with multiple ports permit a daisy chained bus topology, even though the signaling environment is point-to-point. That is, when a multi-port node receives a packet of data, the data is detached and retransmitted to the necessary port as indicated within the data. The configuration is performed dynamically as new devices are attached and/or removed from bus 180.

The 1394 standard bus protocol is designed to support peer-to-peer transfers between devices. This allows serial bus devices to transfer data between themselves without intervention from a computer system or host system. This allows high throughput between devices without affecting the performance of the computer system. Thus, a video camera may be set up to transfer between itself and a video cassette recorder without accessing a computer system.

Figure 3:
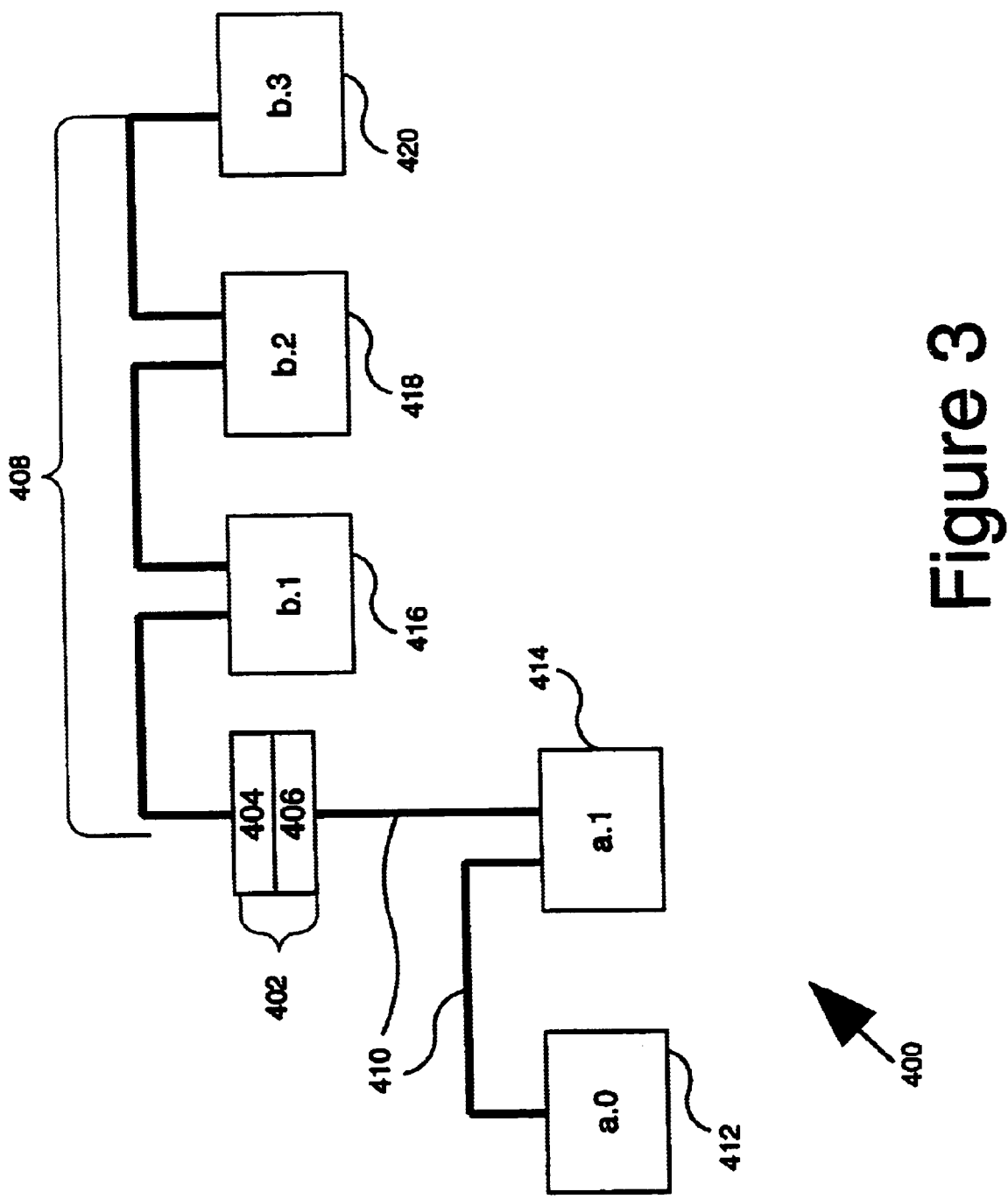
FIG. 3 is a block diagram of one embodiment for a 1394 standard bus bridge system.

FIG. 3 is a block diagram of one embodiment for a 1394 standard bridge bus system 400. Referring to FIG. 3, system 400 includes bridge 402 which connects two or more buses 408 and 410. Bus 408 and 410 may be the same or different types of buses. For example, bus 408 may be a 1394 standard serial bus and bus 410 may be a different high performance bus. The 1394 standard bus architecture limits the number of nodes or devices 310 on a bus 263 and supports multiple bus systems via bus bridge 402.

The control and status register (CSR) architecture, ISO/IEC 13213 (ANSI/IEEE 1212), *Information systems-Control and Status Registers* (CSR) *Architecture Microcomputer Buses*, defines the 1394 standard bus addressing structure, which allows approximately $2^{16}$ nodes (404, 406, 412–420). The CSR standard defines their registry, their functionality, and, where appropriate, where they appear in the address space.

Figure 4:
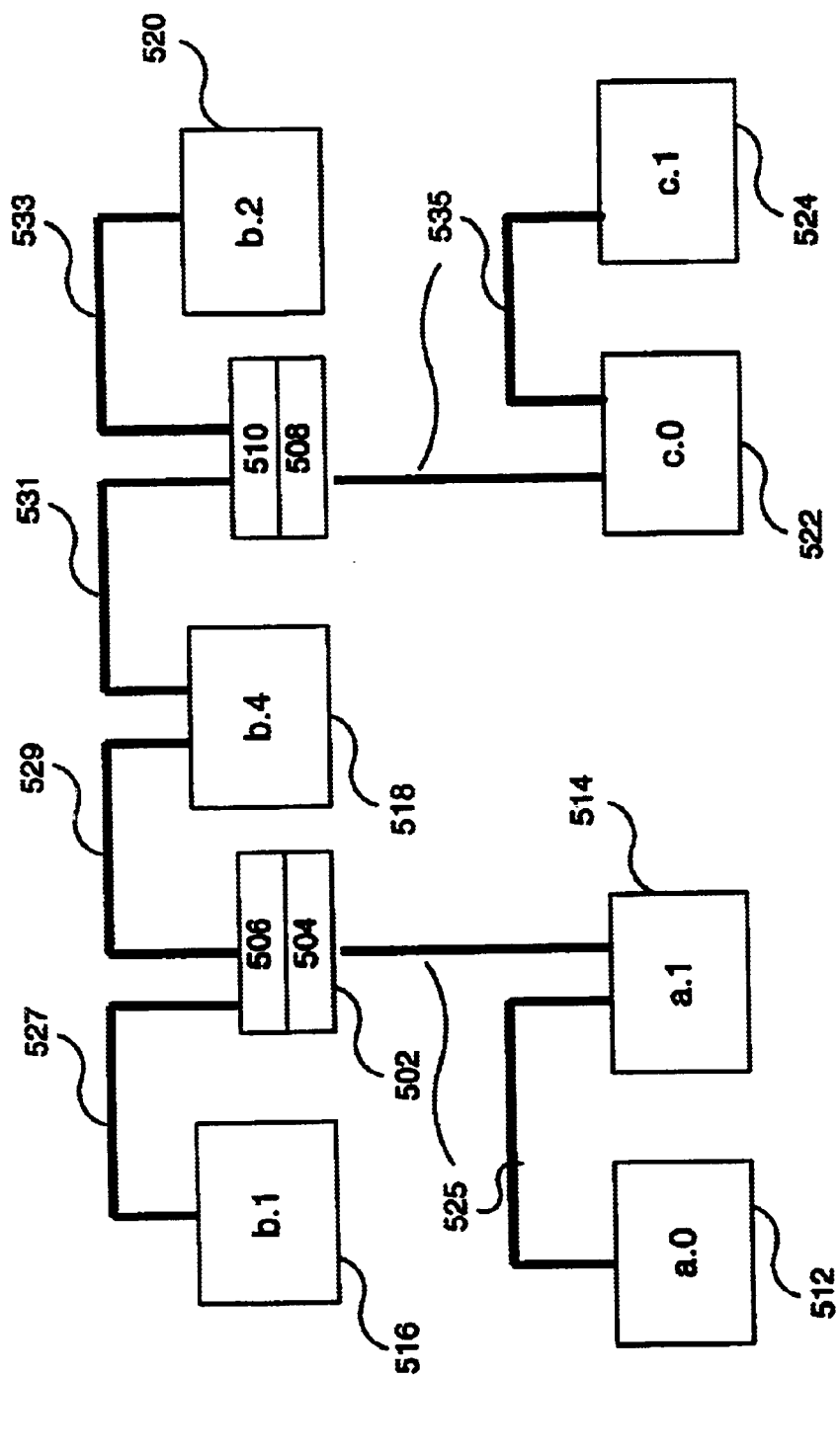
FIG. 4 is a block diagram of one embodiment for a 1394 bus bridge topology.
Figure 5:
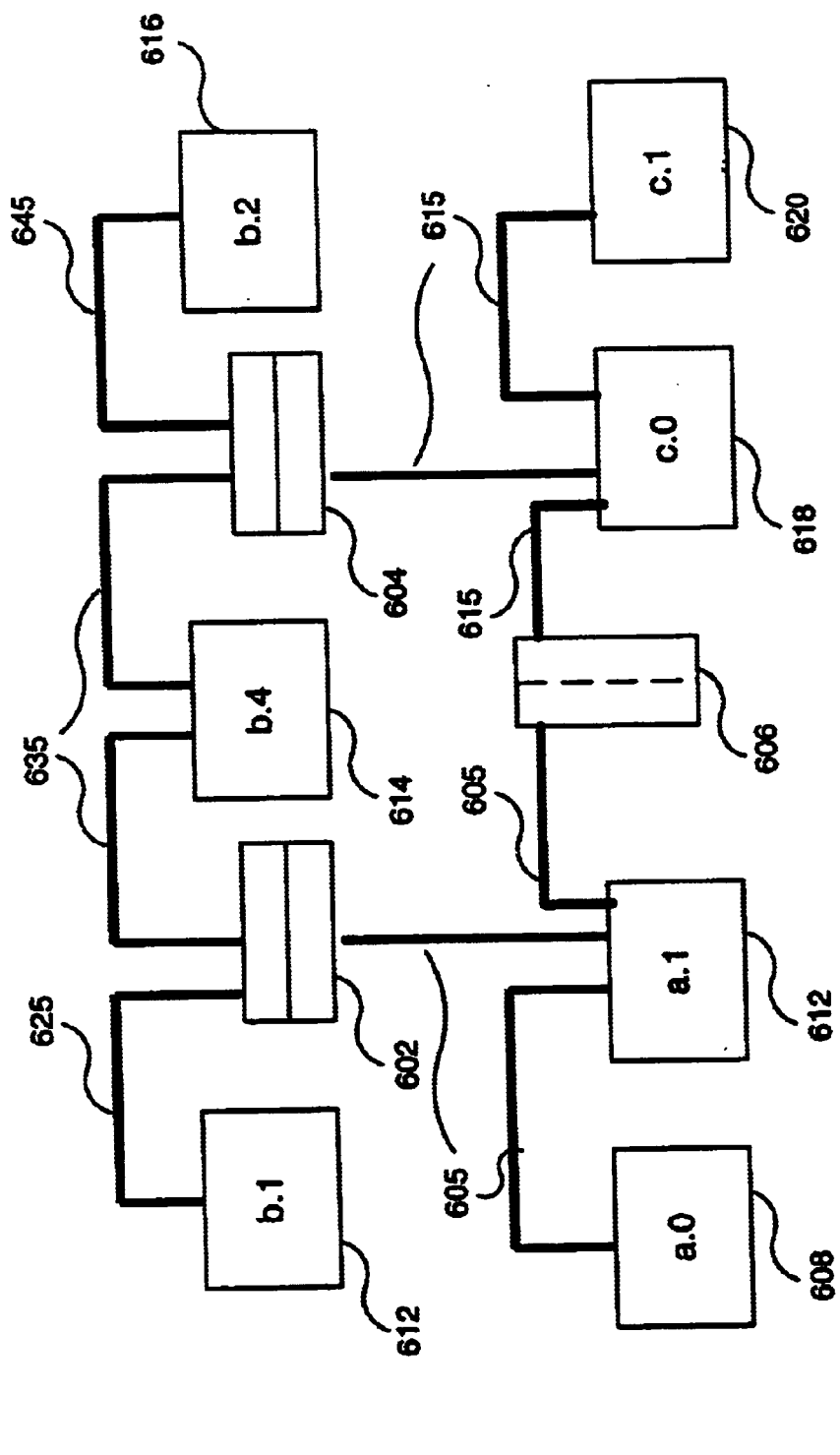
FIG. 5 is a block diagram of one embodiment for a looped bus bridge topology.

FIG. 3 is the simplest instance of a bus topology in which the net has one bus bridge. FIG. 4 illustrates a net that may have more than one bus bridge and, when so structured, is hierarchical in nature. FIG. 5 illustrates a network whose physical topology may have loops, but whose loops are electronically disabled to generate a hierarchical structure. In the description that follows, a collection of multiple buses connected through a bus bridge is referred to as a "net".

FIG. 4 is a block diagram of one embodiment for a 1394 bridge bus topology 500. Referring to FIG. 4, topology 500 has one prime portal 504 and one or more alpha portals 506 and 508. The primary bus 525 has exactly one prime portal 504 and the secondary buses 527, 529, 531, 533, and 535 have exactly one alpha portal each—506,508 and 510. Each bus 525–535 may have any number of secondary portals. An alpha portal is on the path to a prime portal. Any portal not a prime portal or an alpha portal is a secondary portal. The prime portal or the alpha portal may be referred to as a primary portal.

Within an interconnect topology 500, the bridge portal with the largest portal ID identifier is elected to become the prime portal 504. In an alternate embodiment, the bridge portal with the smallest portal ID identifier is elected to become the prime portal 504. Each portal appears as a node on its attached bus. The bus with the prime portal 504 is termed the primary bus 525 and other buses 527–535 are termed secondary buses. On secondary buses 527–535, the bridge portal that leads to the primary bus 525 is called the alpha portal (506, 508). After a bridge bus interconnect is configured, any node within the interconnect may be accessed by its unique 16-bit node identification address. The node identification address contains the bus ID and the local ID components. Referring to FIG. 4, the bus identification IDs of nodes 512–524 are indicated by the letters a, b, and c and the local ID is indicated by the numbers 0–4.

Alpha portal 504 is responsible for rejecting missed address asynchronous data packets by accepting these requests and returning error reporting responses. The previous and current prime and alpha portal identifiers are used to classify nodes when an interconnect topology changes, and the alpha portal is the isochronous clock reference for other nodes on the bus.

Bus bridge topology 500 may change and be established dynamically during operation of bus bridge system 500. In one embodiment, the bus bridge topology 500 is established during net refresh. Within topology 500, portals selectively route packets. Asynchronous routing tables are stable until topology 500 changes during a net refresh or net reset operation. Asynchronous routing tables are dynamic and are changed by their asynchronous connect and disconnect operations of the protocols.

FIG. 5 is a block diagram of one embodiment for a looped bus bridge topology 600. Referring to FIG. 5, during node 300 addition, portal 606 may be added to the topology 600 forming a loop. Thus, a path exists from a0–b4 through c0 back to a0. During initialization, the redundant portal 606 is disabled so that a hierarchical bus bridge topology remains.

In an alternate embodiment, cyclical net topologies may be allowed. In this alternate embodiment, software routines may partially activate the redundant bridge 606 and allow a shortest path routing between nodes. For example, traffic between bus a 605 and bus c 615 may be efficiently routed without introducing deadlocks.

Figure 6:
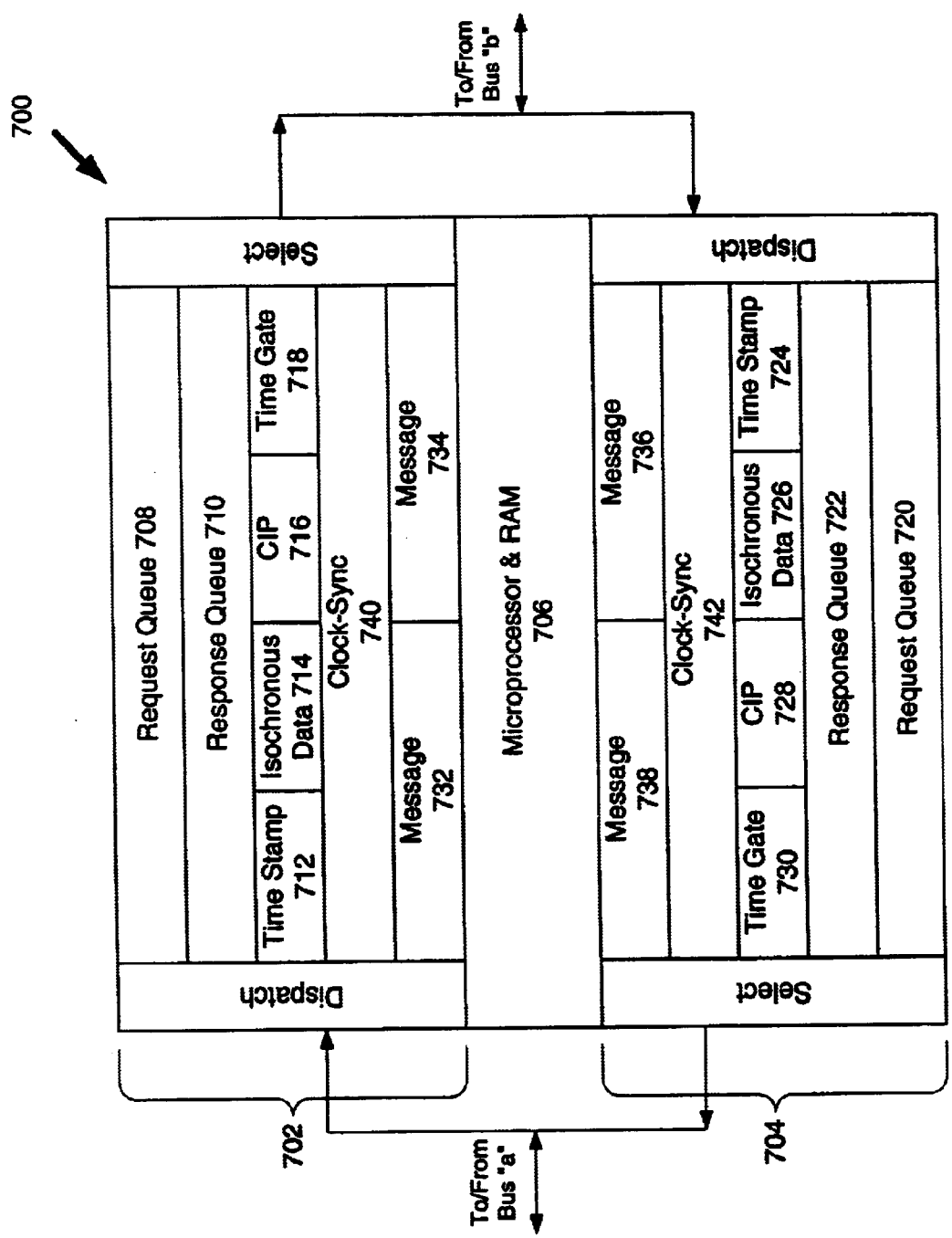
FIG. 6 is a block diagram of one embodiment for bus bridge components.

FIG. 6 is a block diagram of one embodiment for bus bridge components 700. Referring to FIG. 6, bus bridge components 700 are maintained within each portal in which bus "a" to bus "b" components 702 and bus "b" to bus "a" components 704 are independently maintained. Components 700 also contains shared microprocessor and RAM 706.

Asynchronous and isochronous packet transfers may not acquire a bus at the same time. Therefore, asynchronous packets are placed in request queues 708, 720 and response queues 710, 722. The asynchronous packets are selected for transfer at times when isochronous packets are not being transferred. Isochronous packets are received and time stamped 712, 724. Time gates 718, 730 release the isochronous packets 714, 726, together with common isochronous packet (CIP) headers 716, 728, at fixed times. Routing tables select which asynchronous and isochronous packets are accepted and queued for adjacent bus delivery.

Topologies may share physical buffer space rather than implementing physical distinct stacks subject to the following: bus "a" to bus "b" and bus "b" to bus "a" queues operate independently, response processing is never blocked by queued requests, and asynchronous subactions and isochronous packets are forwarded independently. Topologies may block a request behind the previously queued response without generating potential deadlocks; however, requests and responses are processed independently.

Isochronous routing decisions are made by checking the isochronous packet's channel number. Accepted packets are converted and retransmitted on the adjacent bus with newly assigned channel numbers, speeds, and CIP-header and, when a CIP-header is provided, time-stamp parameters 716, 728 from the CIP-header. CIP-headers may be pre-appended to some isochronous packets to further describe their format and function and desired presentation time. When the packets incur delays while traversing through a bridge, then presentation time must be adjusted to compensate for this delay. CIP headers are defined in ISO/IEC 61883 specification. Isochronous packets received in cycle n are forwarded to the adjacent bus in cycle n+k where k is an implementation dependent constant. Messages may be passed around one bus or pass through a bridge by writing to a standardized message location 732, 734, 736, 738 on a bridge's portal. This allows bus-interconnect topologies to be restored while freezing, or discarding when necessary, previously queued subactions.

Distribution of clock-sync information 740, 742 from the primary-bus source is performed by placing calibration information in isochronous-clock pseudo queues before forwarding this information to the clock master on the adjacent portal. In one embodiment, clock-sync information flows from the primary bus downward, so that only one clock-sync pseudo queue may be required.

In support of bus bridges, each node has two node ID addresses: physical ID address and virtual ID address. A physical node ID has a $3FF_{16}$ valued bus ID; a virtual node ID has smaller bus ID addresses. In the absence of bus bridges, all nodes are accessed through their physical addresses. In the presence of bus bridges, the physical address is used to configure the node and the virtual address is normally used thereafter.

Directed-asynchronous routing decisions are made by checking the destination ID addresses of pass-through packets. Accepted packets are directly routed to the bridge's opposing port. In addition, an asynchronous quarantine is maintained which selectively enables forwarding of a request sub-action based on the local identification of a bus-local requester. A set of legacy bits identifies local nodes which requires specific processing of sourced requests and returning responses.

Figure 7:
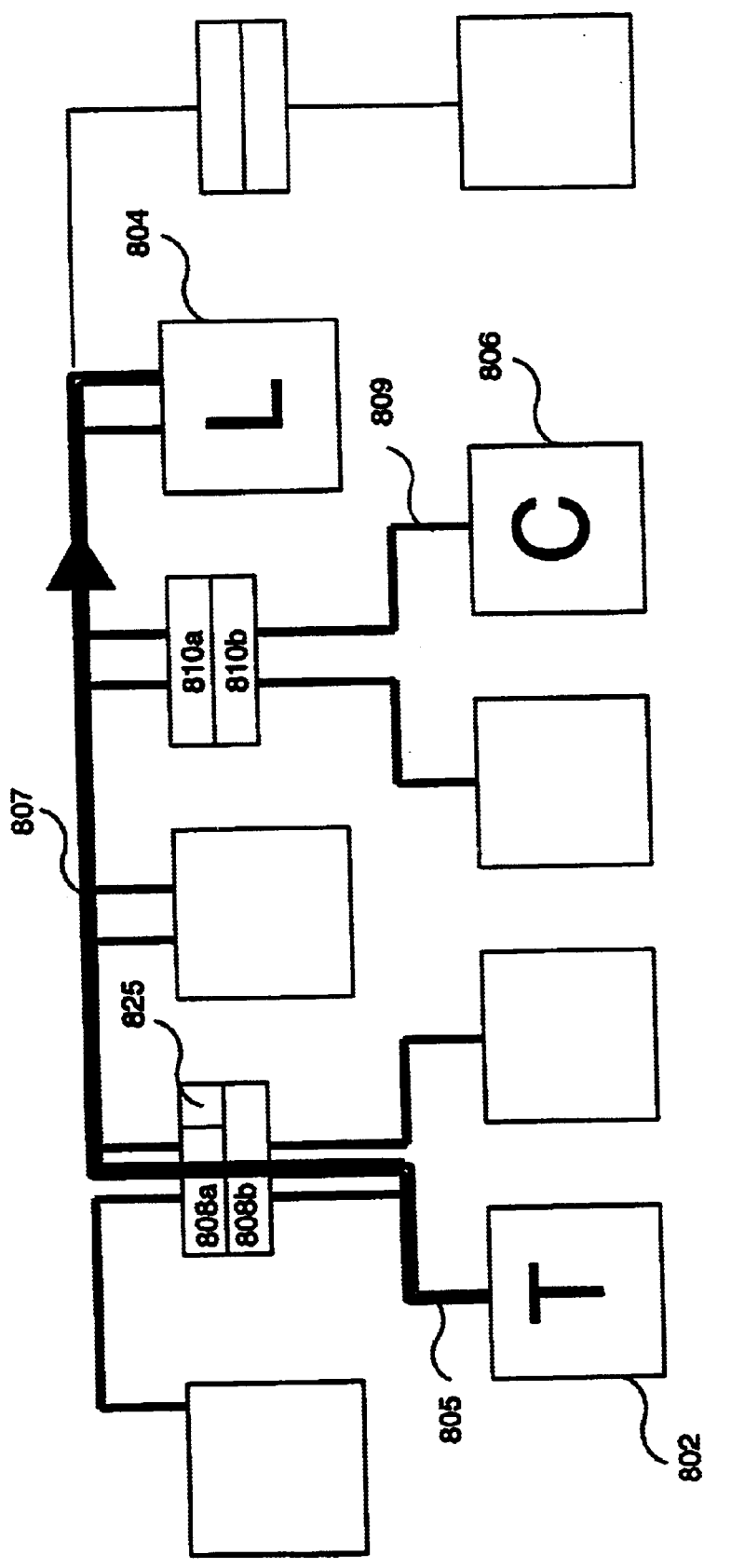
FIG. 7 is a block diagram of one embodiment for bus bridge isochronous transfer.

FIG. 7 is a block diagram of one embodiment for bus bridge isochronous transfer. Referring to FIG. 7, isochronous connections involve one talker 802 and one or more multiple listener 804/controller 806 pairs. Isochronous packets are accepted based on the current channel identification and are retransmitted on the adjacent bus with a new channel ID. A controller 806 establishes an isochronous connection. The isochronous connection enables communication between talker 802 and listener 804. An isochronous connection may be made between a single talker 802 and multiple listeners 804.

Isochronous non-overlaid connections proceed as follows: controller 806 sends a message to the final portal 810a in the path towards listener 804. If necessary, portal 810a forwards the message to the first portal on the path between the listener 804 and talker 802 (in this case, portal 808a). Portal 808a acquires isochronous resources from IRM 825 on its bus. IRM may be located within portal 808a or any other node. The message is forwarded towards the talker bus 805, which results in the message being received by portal 808b. Portal 808b acquires the isochronous resources in IRM 825 and updates the oPCR within talker 802. The message is forwarded back toward listener 804, which results in it being received by portal 808a. Portal 808a updates the iPCR on listener 804 so that it listens to the correct channel. Portal 808a forwards a message-complete indicator to controller 806.

In one embodiment, a disconnect message is sent from controller to portal 810b. Portal 810b forwards the message to portal 808a which updates the iPCR on listener 804 and releases the IRM resources associated with bus 807. The message is forwarded to portal 808b. The oPCR of talker 802 is updated in order to stop transmission. Portal 808b updates the IRM resources associated with bus 805. A completion message is then sent from portal 808b to controller 806.

In an alternate embodiment, controller 806 sends a disconnect message toward listener 810a, which results in the message being received by portal 810a. Portal 810a forwards the message to portal 808a (the talker side portal of listener 804). Portal 808a forwards the message towards talker 802, which results in the message being received by portal 808b. Portal 808b updates the oPCR of talker 802 in order to stop transmission. Portal 808b accesses IRM 825 to release isochronous channel and bandwidth resources associated with bus 805. Portal 808b forwards the message toward listener 804, which results in the message being received by portal 808a. Portal 808a updates the iPCR of listener 804 in order to stop listener 804 from listening. Portal 808a updates the IRM isochronous resources associated with bus 807. Portal 808a then sends a completion message to controller 806.

Figure 8:
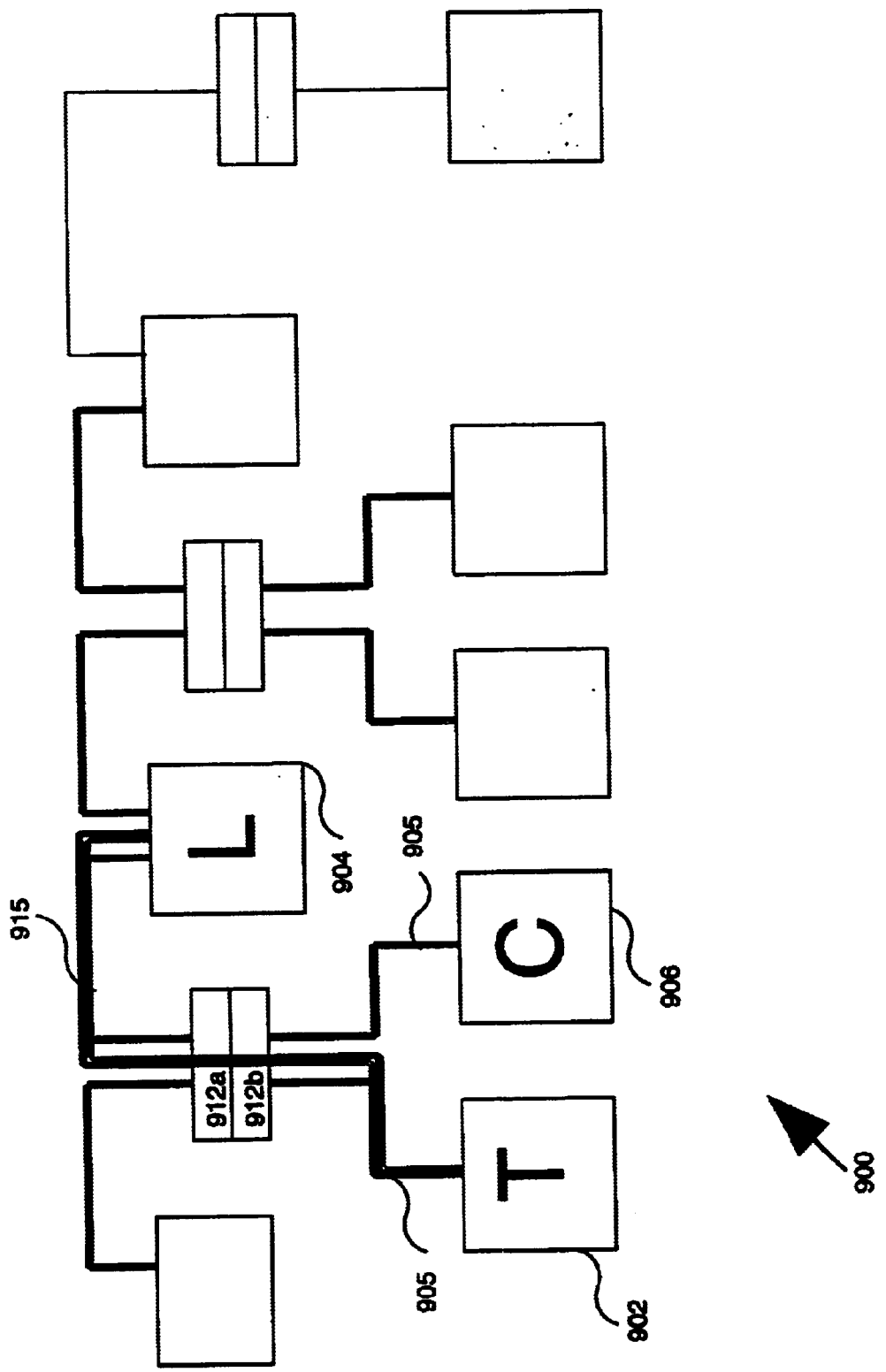
FIG. 8 is a block diagram of another embodiment for bus bridge isochronous transfer.

FIG. 8 is a block diagram of another embodiment for a bus bridge isochronous transfer. Referring to FIG. 8, a common connection isochronous transfer is illustrated. Talker 902 is connected by controller 906 to listener 904. In one embodiment, controller 906 may be on the talker bus 905, listener bus 915, or other bus. Each listener 904 is associated with a controller 906. The controller 906 may be the same or different for the various listeners 904.

In the example of FIG. 8, the connection message from controller 906 is processed by portal 912a in which it is found to have the same stream ID. This allows the new listener to list to the previously established channel.

In one embodiment, a disconnect message is sent from controller 906 towards listener 904, which results in the message being received by portal 912a. Portal 912a updates the iPCR of listener 904 in order for listener 904 to stop listening. Portal 912a decrements its use count and returns a completion message to controller 906.

Figure 9:
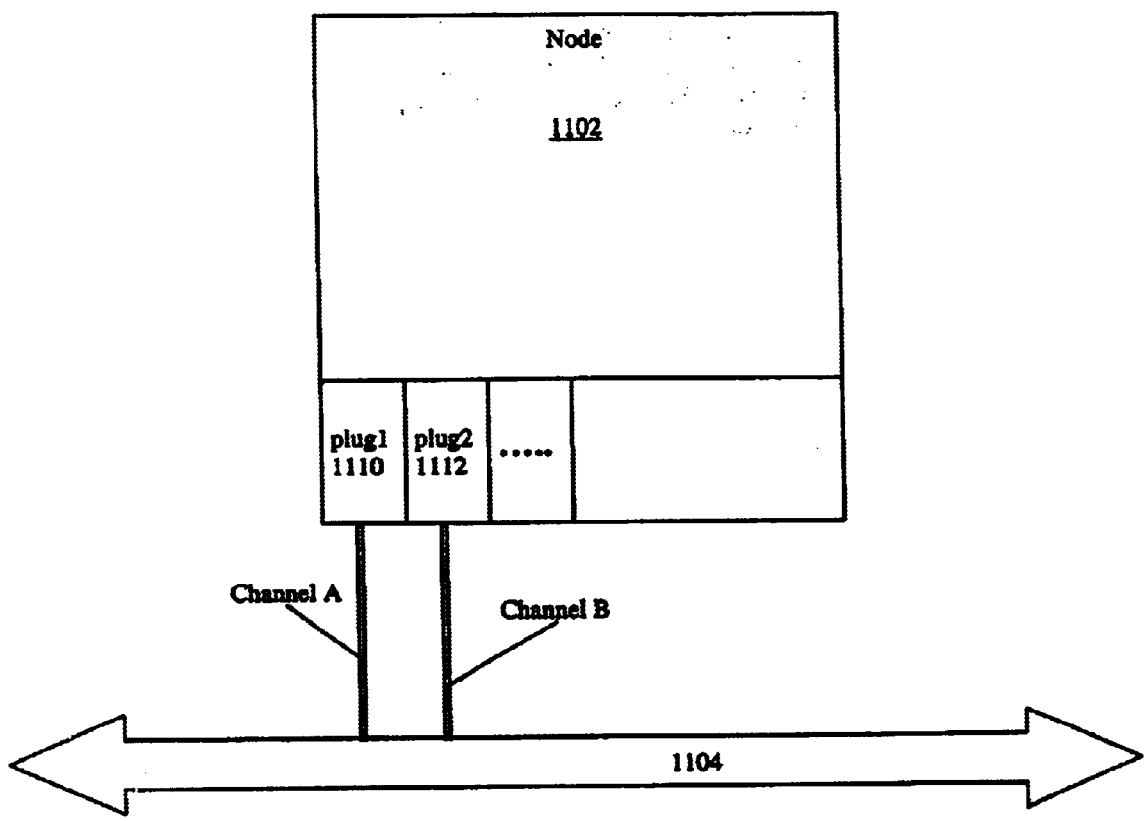
FIG. 9 is a block diagram of an embodiment for a node with multiple plugs.

FIG. 9 is a block diagram 1100 of an embodiment for a node with multiple plugs. Diagram 1100 includes a node 1102 and a bus 1104. In one embodiment, a bus includes multiple channels in which each channel may transmit a set of information. Multiple plugs 1110–1112 may be used to connect node 1102 to a number of channels. For example, node 1102 may send a set of data packets to channel A through plug 1110 and another set of data packets to channel B through plug 1112. In one embodiment, a plug id is a stable value because its value does not change after bus refresh or bus reset.

In one embodiment, the stream id is identified by concatenating the EUI of the talker followed by a plug id of the talker. The EUI is a unique serial number, a portion of which is issued by IEEE. For example, an EUI may be a 64-bit wide value representing a serial number. In an alternative embodiment, the stream id may be identified by concatenating an EUI followed by an plug ID of the node. In yet another embodiment, any combination of any two stable values of a node, such as EUI and a stable value, may be used to provide a stream id.

A stable value of a node indicates a value that does not change. For example, a stable value, such as EUI or plug id, does not change its value after a bus reset or net refresh. On the other hand, a non-stable value, such as a channel number, may change after a bus or net refresh. In another embodiment, an address offset, which may be the last 48-bit of a node address, may be used as a stable value for generating the stream id. In yet another embodiment, a register offset may be used to generate the stream id. The register offset is a value of ROM entry that describes the resources.

Figure 10:
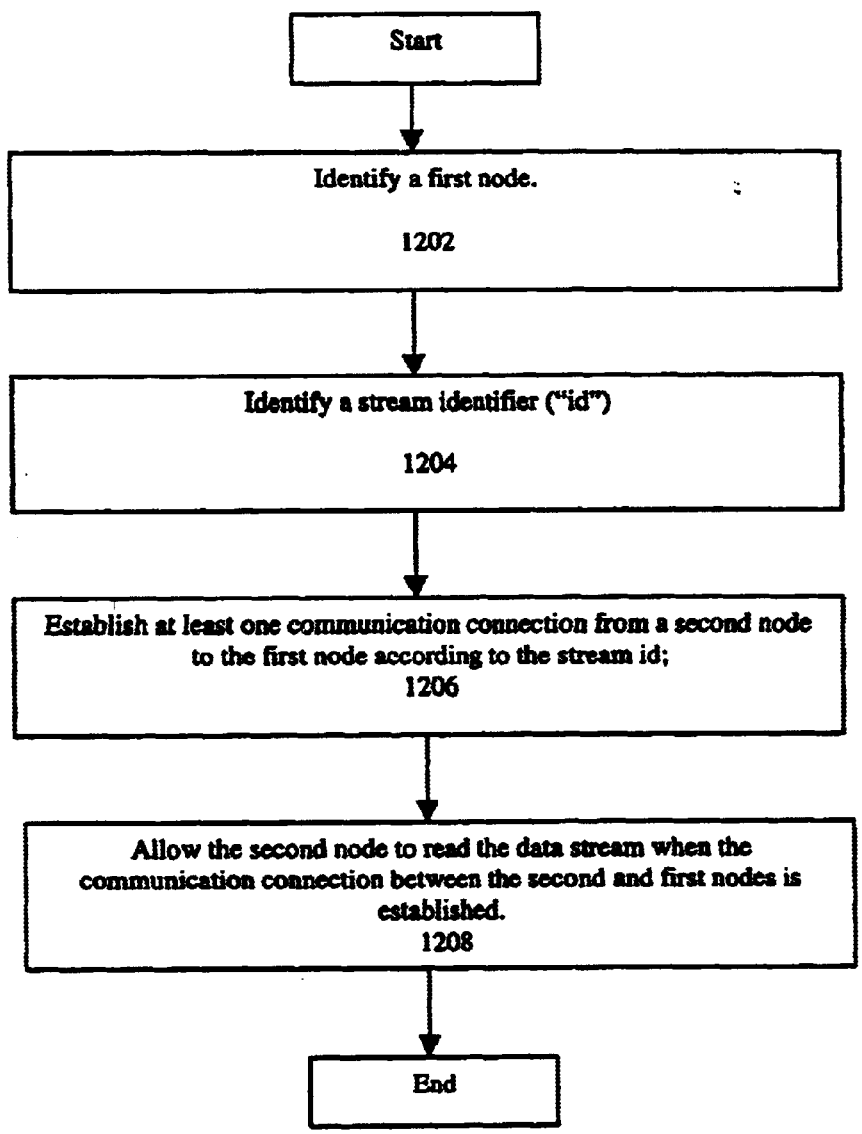
FIG. 10 is a flow diagram of an embodiment for connecting buses using stream identifiers.

FIG. 10 is a flow diagram of an embodiment for connecting buses using a stream identifier (id). Initially at block 1202, the process identifies a talker node. In one embodiment, the talker node is a talker node that generates an isochronous data stream and forwards the isochronous data stream onto a communication media, such as a bus.

At block 1204, the stream id is identified. In one embodiment, the stream id is identified by combining the EUI and a plug id of the talker node.

At block 1206, a communication from the listener node to the talker node is established according to the stream id. In one embodiment, the communication is accomplished when a bus connection from the listener node to an intermediate bridge portal or a bus bridge, which is already connected to the talker node, is established. The intermediate bridge portal may be identified based on the stream id.

At block 1208, the listener node reads or receives the data or packets from the isochronous data stream.

Thus, a method and an apparatus for providing a communication connection using a stream id have been described. The specific arrangements and methods herein are merely illustrative of the principles of this invention. Numerous modifications in form and detail may be made by those skilled in the art without departing from the true spirit and scope of the invention.

What is claimed is:

1. A process engine comprising:
    a first module configured to execute a process to identify a talker node, wherein the talker node provides an isochronous data stream via a communication media;
    a second module coupled to the first module and configured to execute a process to identify a stream identifier associated to the data steam, wherein the stream identifier is identified based on a identifier and a sub-identifier of the talker node;
    a third module coupled to the first module and configured to establish a connection from the talker node to an intermediate bus bridge in response to the stream identifier; and
    a fourth module coupled to the first module and configured to share the connection among a plurality of listener nodes that read the isochronous data stream from the intermediate bus bridge.

2. The process engine of claim 1, wherein the connection operates in an environment substantially similar to a version of IEEE 1394.

3. The process engine of claim 1, wherein the isochronous data stream includes a plurality of packets.

4. The process engine of claim 1, wherein the communication media includes a plurality of buses and bus bridges.

5. The process engine of claim 1, wherein the communication media further includes a plurality of channels for transferring packets.

6. The process engine of claim 1, wherein the identifier is an extended unique identifier of a talker node.

7. The process engine of claim 1, wherein the sub-identifier is a plug identifier of a talker node, wherein the plug identifier is associated with a channel number.

8. A computer medium readable by a processor, the medium having stored thereon a sequence of instructions which, when executed by the processor, causes the processor to:
    identify a talker node that generates an isochronous data stream;
    identify a stream identifier ("id") associated with the isochronous data stream based on an identifier and a sub-identifier of the talker node;
    establish a connection between the talker node and an intermediate bus bridge according to the isochronous stream id; and
    share the connection among a plurality of listener nodes that read the isochronous data stream from the intermediate bus bride.

9. The computer medium of claim 8, further comprising causing the processor to:
    identify an extended unique identifier ("EUI") of the talker node for the identifier of the talker node; and
    identify a plug id of the talker node for the sub-identifier of the talker node.

10. The computer medium of claim 8, wherein establishing the connection includes operating the connection in an environment substantially similar to a version of IEEE 1394.

11. The computer medium of claim 8, further comprising causing the processor to build a communication path from a listener node to the talker node through the connection.

12. The computer medium of claim 8, wherein causing the processor to share the connection further includes increasing a use-count indicating that the intermediate bus bridge provides the isochronous data stream to more than one listener nodes.

13. A method for providing an isochronous connection in a bus bridge interconnect including a plurality of buses linked by at least one bus bridge, the method comprising:
    identifying a talker node that provides an isochronous data stream via a communication media;
    identifying a stream identifier associated with the isochronous data stream based on an extended unique identifier and a plug identifier of the talker node;
    establishing a connection between the talker node and the at least one bus bridge according to the stream identifier; and
    sharing the connection among a plurality of listener nodes that read the isochronous data stream from the at least one bus bridge.

14. The method of claim 13, further comprising building a bus connection from one of the listener nodes to a bus carrying the isochronous data stream through the connection between the talker node and the at least one bus bridge.

15. A method of claim 13, wherein sharing the connection further includes increasing a use-count indicating the at least one bus bridge provides the isochronous data stream to more than one listener nodes.

16. The method of claim 13, further comprising:
    identifying an extended unique identifier ("EUI") of the talker node for the identifier of the talker node; and
    identifying a plug id of the talker node for the sub-identifier of the talker node.

17. The method of claim 13, wherein establishing the connection includes operating the connection in an environment substantially similar to a version of IEEE 1394.

18. The method of claim 13, further comprising:
    identifying an address offset of the talker node for the identifier; and
    identifying a register offset of the talker node for the sub-identifier.

19. A The method of claim 13, further comprising:
    identifying a control node coupled to one of the listener nodes; and
    identifying a resource manager coupled to the at least one bus bridge.

20. An apparatus for uniquely identifying an isochronous stream comprising:
   means for identifying a talker node that generates an isochronous data stream;
   means for identifying a stream identifier ("id") associated with the isochronous data stream based on an identifier and a sub-identifier of the talker node;
   means for establishing a connection between the talker node and an intermediate bus bridge according to the isochronous stream id; and
   means for sharing the connection among a plurality of listener nodes that read the isochronous data stream from the intermediate bus bridge.

* * * * *